US012523007B2

(12) United States Patent
Downie et al.

(10) Patent No.: US 12,523,007 B2
(45) Date of Patent: Jan. 13, 2026

(54) HANDRAIL ASSEMBLY FOR A WORK MACHINE

(71) Applicant: ICL TECH LIMITED, Glasgow (GB)

(72) Inventors: Nick Downie, Bearsden (GB); Mark Mccracken, Lenzie (GB); Andrew Leaver, Paisley (GB)

(73) Assignee: ICL TECH LIMITED, Glasgow (GB)

( * ) Notice: Subject to any disclaimer, the term of this patent is extended or adjusted under 35 U.S.C. 154(b) by 308 days.

(21) Appl. No.: 18/285,234

(22) PCT Filed: Apr. 7, 2022

(86) PCT No.: PCT/GB2022/050867
§ 371 (c)(1),
(2) Date: Sep. 29, 2023

(87) PCT Pub. No.: WO2022/214812
PCT Pub. Date: Oct. 13, 2022

(65) Prior Publication Data
US 2024/0352707 A1   Oct. 24, 2024

(30) Foreign Application Priority Data
Apr. 9, 2021 (GB) ..................................... 2105104

(51) Int. Cl.
*E02F 9/08* (2006.01)
*E02F 9/24* (2006.01)

(52) U.S. Cl.
CPC .............. *E02F 9/0833* (2013.01); *E02F 9/24* (2013.01)

(58) Field of Classification Search
CPC .................................. E02F 9/0833; E02F 9/24
See application file for complete search history.

(56) References Cited

U.S. PATENT DOCUMENTS 5,813,494 A * 9/1998 Ulschmid ................. B60R 3/02
                                                                  182/127
10,577,775 B2 * 3/2020 Miyamoto .............. B66C 13/52
(Continued)

FOREIGN PATENT DOCUMENTS

CN        112031061 A    12/2020
JP        H09-125459 A    5/1997
(Continued)

OTHER PUBLICATIONS

International Search Report and Written Opinion issued for PCT App No. PCT/GB2022/050867 issued Jul. 14, 2022 (8 pages).

Primary Examiner — Jeffrey J Restifo
(74) Attorney, Agent, or Firm — Foley & Lardner LLP

(57) ABSTRACT

A handrail assembly for a work machine is provided. The handrail assembly comprises at least one generally horizontal rail member and a plurality of generally vertical tubular support members (4). Each support member (4) has a first end attached to the at least one rail member, and a second end which is open. A plurality of support plates (10) each have a first portion adapted to be attached to the work machine and a second portion adapted to be attached to the second end of one of the tubular support members (4). A plurality of attachment means attach the second end of each support member (4) to a respective support plate (10). The assembly further comprises a plurality of first elastomeric damping elements (106), where a first elastomeric damping element is sandwiched longitudinally between each support member second end and its respective support plate (10).

14 Claims, 5 Drawing Sheets

(56) References Cited

U.S. PATENT DOCUMENTS

| | | | |
|---|---|---|---|
| 10,844,576 B2 * | 11/2020 | Magnussen | E06C 5/02 |
| 12,012,719 B2 * | 6/2024 | Ishizuka | E02F 9/16 |
| 2012/0205195 A1 * | 8/2012 | Tsutsumi | E02F 9/0833 |
| | | | 182/106 |
| 2014/0353083 A1 * | 12/2014 | Samuel | B60R 3/005 |
| | | | 182/87 |
| 2015/0246641 A1 * | 9/2015 | Jayapalan | B60R 3/005 |
| | | | 182/113 |
| 2015/0291100 A1 * | 10/2015 | Koshy | E02F 9/0833 |
| | | | 280/727 |
| 2024/0352707 A1 * | 10/2024 | Downie | B60R 3/005 |

FOREIGN PATENT DOCUMENTS

| | | |
|---|---|---|
| JP | 2010-077607 A | 4/2010 |
| JP | 2011-017176 A | 1/2011 |

\* cited by examiner

HANDRAIL ASSEMBLY FOR A WORK MACHINE

CROSS-REFERENCE TO RELATED APPLICATIONS

This application is a U.S. National Phase Application under 35 U.S.C. § 371 of International Application No. PCT/GB2022/050867, filed on Apr. 7, 2022, which claims the benefit of and priority to GB Appl. No. 2105104.0 filed Apr. 9, 2021, each of which is incorporated herein by reference in their entirety for any and all purposes.

FIELD OF THE INVENTION

The present invention relates to the field of work machines, and more specifically handrail assemblies which are attached to the bodies of such machines to ensure the safety of operators and technicians who may need to move around on the body of the machine.

BACKGROUND OF THE INVENTION

It has been an established safety requirement for some time that work machines such as excavators are provided with handrail assemblies. These handrail assemblies are attached to the body of the work machine so as to minimise the chances of an operator or technician falling from the machine as they move about upon the body.

To date, these handrail assemblies have been formed from an arrangement of metal tubes, which are attached to the body of the work machine. As work machines are often used in harsh conditions and exposed to severe weather these metal assemblies can corrode relatively quickly. These can lead to the tubes and/or the fixtures holding them failing over time, thus compromising the safety of any personnel relying on the assembly to keep them safe. Furthermore, modern work machines are equipped with a number of complex electronic components which rely on communications from remote locations. These metal handrail assemblies can interfere with such communications, thus compromising the operation of the machine. Metal handrail assemblies are also heavy and require painting. The paint can degrade over time, leaving the handrail assembly looking dilapidated and needing re-painting to improve its appearance.

Naturally, work machines also generate a comparatively high amount of vibration during operation. These vibrations can lead to the mechanical fixtures which hold the handrail assembly together loosening over time, or indeed failing completely. It can also cause the tubes of the assembly to shear due to vibration fatigue. This increases the amount of maintenance and inspection time which is needed on these existing handrail assemblies, and also increases the likelihood that at least some portions of the handrail assembly may need to be replaced prematurely.

It is an aim of the present invention to obviate or mitigate one or more of these disadvantages with existing handrail assemblies.

SUMMARY OF THE INVENTION

According to a first aspect of the present invention there is provided a handrail assembly for a work machine, the assembly comprising:
at least one generally horizontal rail member;
a plurality of generally vertical tubular support members, each support member having a first end attached to the at least one rail member, and a second end which is open; and
a plurality of support plates, each support plate having a first portion adapted to be attached to the work machine and a second portion adapted to be attached to the second end of one of the tubular support members;
a plurality of attachment means for attaching the second end of each support member to a respective support plate; and
a plurality of first elastomeric damping elements, where a first elastomeric damping element is sandwiched longitudinally between each support member second end and its respective support plate.

Each first elastomeric damping element may be annular and each attachment means may comprise:
a rod having a first end attached to the second portion of the support plate and projecting upwards from the support plate inside the second end of the support member, the first elastomeric damping element being located about the first end of the rod and the rod having a first fixing aperture extending transversely through the rod;
a pair of second fixing apertures provided at diametrically opposed locations on the support member; and
a mechanical fixture adapted to pass through the first and second fixing apertures in order to secure the support member to the support plate when the first and second fixing apertures are aligned.

The rod may be threaded and each attachment means may further comprise:
a cylindrical sleeve located about the rod inside the second end of the support member and having a first end in contact with the first elastomeric damping element;
a second elastomeric damping element being located about the rod and in contact with a second end of the sleeve; and
a locking nut threaded onto a second end of the rod so as to secure the first and second damping elements and the sleeve on the rod;
wherein the sleeve has a pair of third fixing apertures at diametrically opposed locations on the sleeve, and wherein the mechanical fixture is adapted to pass through the first, second and third fixing apertures in order to secure the support member to the support plate when the first, second and third fixing apertures are aligned.

The sleeve may be corrugated and include a plurality of grooves running circumferentially about an outer surface of the sleeve, and wherein an adhesive layer is provided on the outer surface of the sleeve so as to adhere the sleeve to an internal surface of the second end of the support member.

The mechanical fixture may comprise a threaded bolt and the assembly may further comprise at least one elastomeric sleeve which extends through the fixing apertures and receives the threaded bolt. Preferably, the elastomeric sleeve has a flange at one end thereof, which limits the extent to which the sleeve can enter the fixing apertures.

Each support plate may have a support surface which in use lies upon the work machine, and wherein the assembly further comprises at least one elastomeric support element provided on the support surface.

The first portion of the support plate may include at least one attachment aperture, and the at least one elastomeric support element may be annular and surround the at least one attachment aperture.

Preferably, the rail members comprise a plurality of top rail members attached between first ends of a pair of support members, and a plurality of intermediate rail members attached between a pair of support members at a location between the first and second ends of the support members.

Preferably, the at least one rail member and support members are attached to one another by pairs of clamp members which are secured to one another about a support member and/or rail member.

The at least one rail member and support members are preferably formed from a plastics material.

Preferably, the at least one rail member, support members and clamp members are formed from a plastics material.

The plastics material may glass reinforced plastic, otherwise known as glass reinforced polymer.

Preferably at least one support plate has a pair of first portions adapted to be attached to the work machine, and a pair of second portions, each second portion adapted to be attached to a second end of one of the support members.

According to a second aspect of the invention there is provided a work machine comprising a handrail assembly in accordance with the first aspect of the invention.

BRIEF DESCRIPTION OF THE DRAWINGS

A preferred embodiment of the present invention will now be described, by way of example only, with reference to the following drawings.

DETAILED DESCRIPTION OF THE DRAWINGS

Figure 1:
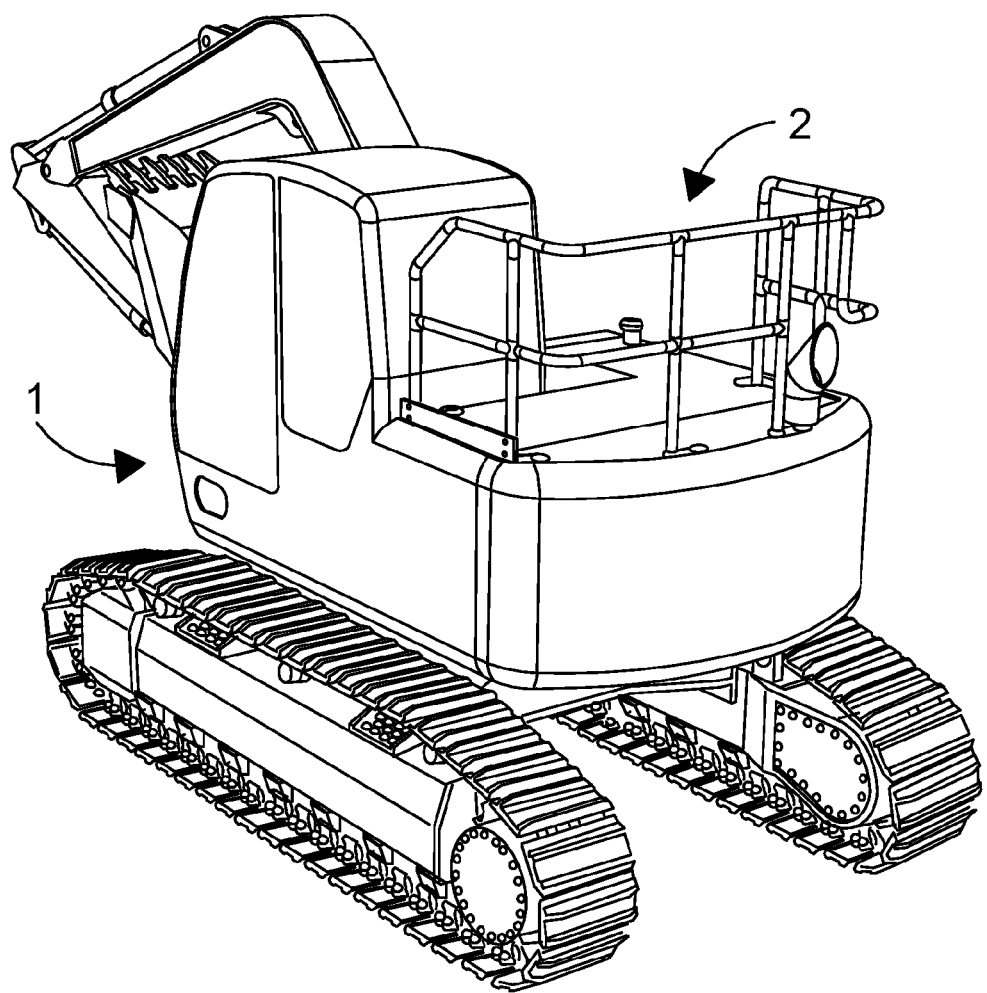
FIG. 1 is a perspective view of a work machine with a handrail assembly attached thereto.

A work machine 1 having a handrail assembly 2 in accordance with the present invention is shown in FIG. 1. In the illustrated example the machine is an excavator, but the handrail assembly of the present invention can be employed on any work machine where personnel may need to move across the body of the machine. Other non-limiting examples of work machines where handrails are required include earthmoving equipment such as dump trucks and bulldozers, and road construction machinery such as road planers and pavers.

Figure 2:
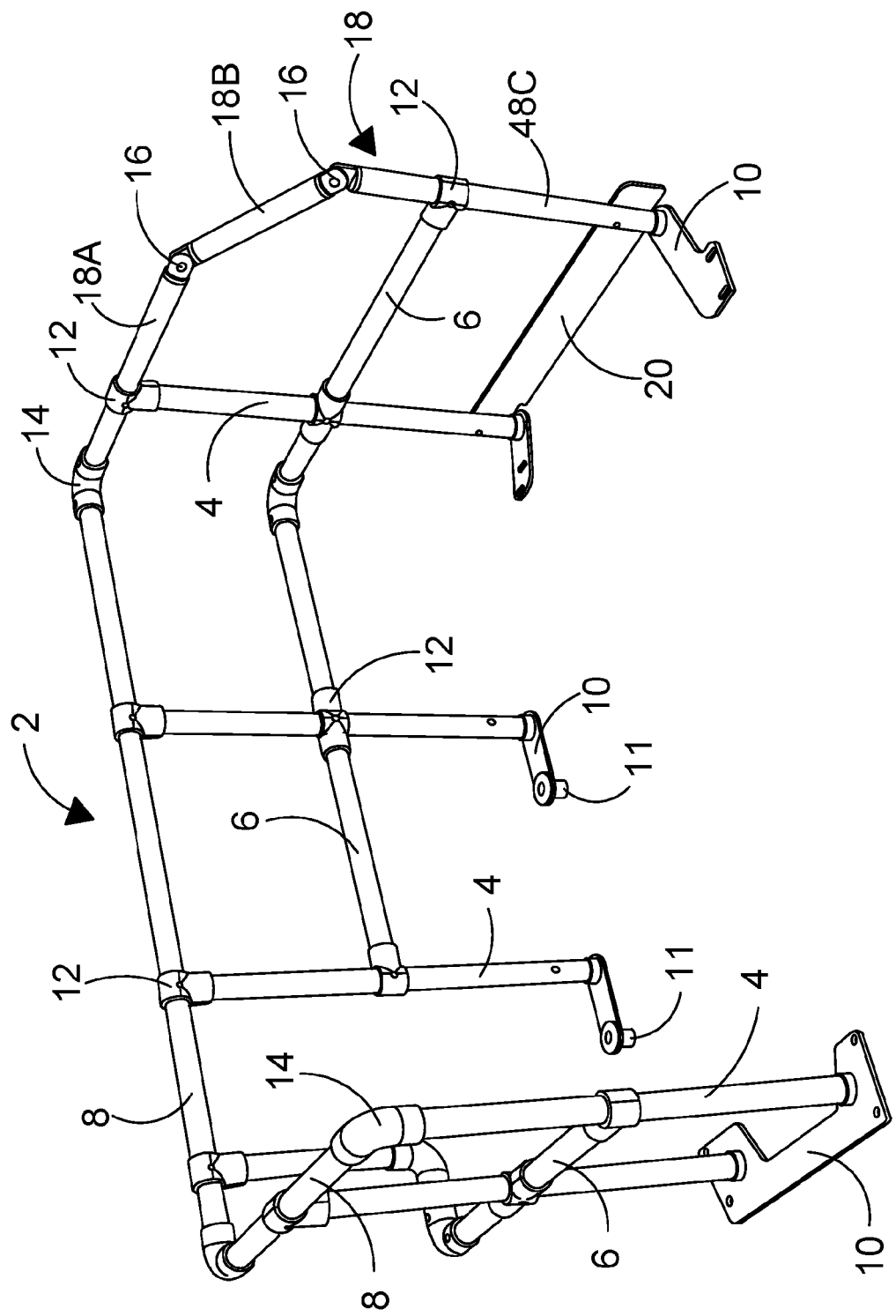
FIG. 2 is a perspective view of the handrail assembly shown in FIG. 1.

FIG. 2 provides a more detailed view of the handrail assembly seen in FIG. 1. Aside from the fixtures which hold the assembly together each of the components which make up the framework of the assembly is formed from a plastics material. One preferred plastics material from which the framework may be made is glass reinforced plastic (GRP). A suitable alternative may be polyvinyl chloride (PVC). The framework components are preferably tubular.

The assembly 2 comprises a plurality of uprights 4, intermediate rails 6 and top rails 8. Each upright 4 is attached to a footplate 10 at a lower end thereof, which is either dedicated to that particular upright or else is shared by a pair of uprights. The footplates 10 attach the uprights to the body of the work machine, as will be described in more detail below.

At an upper end of each upright 4 is a connector or clamp 12 which connects the upper ends of the uprights 4 to one of a series of top rails 8 which define an upper perimeter of the assembly 2. In the illustrated embodiment the uprights 4 and top rails 8 are attached by two piece clamps 12, where the two pieces of the clamp are brought together from either side of the joint and fixed together with a threaded bolt and nut or similar mechanical fixtures. At the corners of the assembly 2 where an upper end of an upright 4 meets a free end of a top rail 8, a generally L-shaped connector 14 may be placed on the respective ends of the upright and top rail and fixed thereto with threaded bolts and nuts or similar mechanical fixtures.

As can be seen on the right hand side of the illustrated assembly 2, a two- or three-part angled component 18 may be provided, which acts as both an upright and top rail in a single element. The tubular parts 18A-C of the angled element 18 are pivotably connected together about pivot pins 16. This angled component 18 allows the assembly to include angular elements, which can be used to act as a grab handle for personnel climbing onto the machine body and/or to ensure that elements of the assembly do not foul or interfere with components of the machine itself, such as an engine exhaust pipe for example.

The intermediate rails 6 are connected to the uprights 4 at locations intermediate the ends of each upright. The ends of the intermediate rails 6 are attached to the uprights 4 using two piece clamps 12, which either define a single female receptor for an end of an intermediate rail 6, or else a pair of female receptors facing in opposing directions if the ends of two intermediate rails 8 are to be connected to an upright 4. Again, L-shaped connectors 14 can be employed to connect the ends of two adjacent intermediate rails 6 at a corner of the assembly 2. The assembly 2 may also incorporate one or more kickplates or upstands 20 to ensure that tools or the like are captured if they are dropped whilst work is being carried out on the machine.

Figure 3:
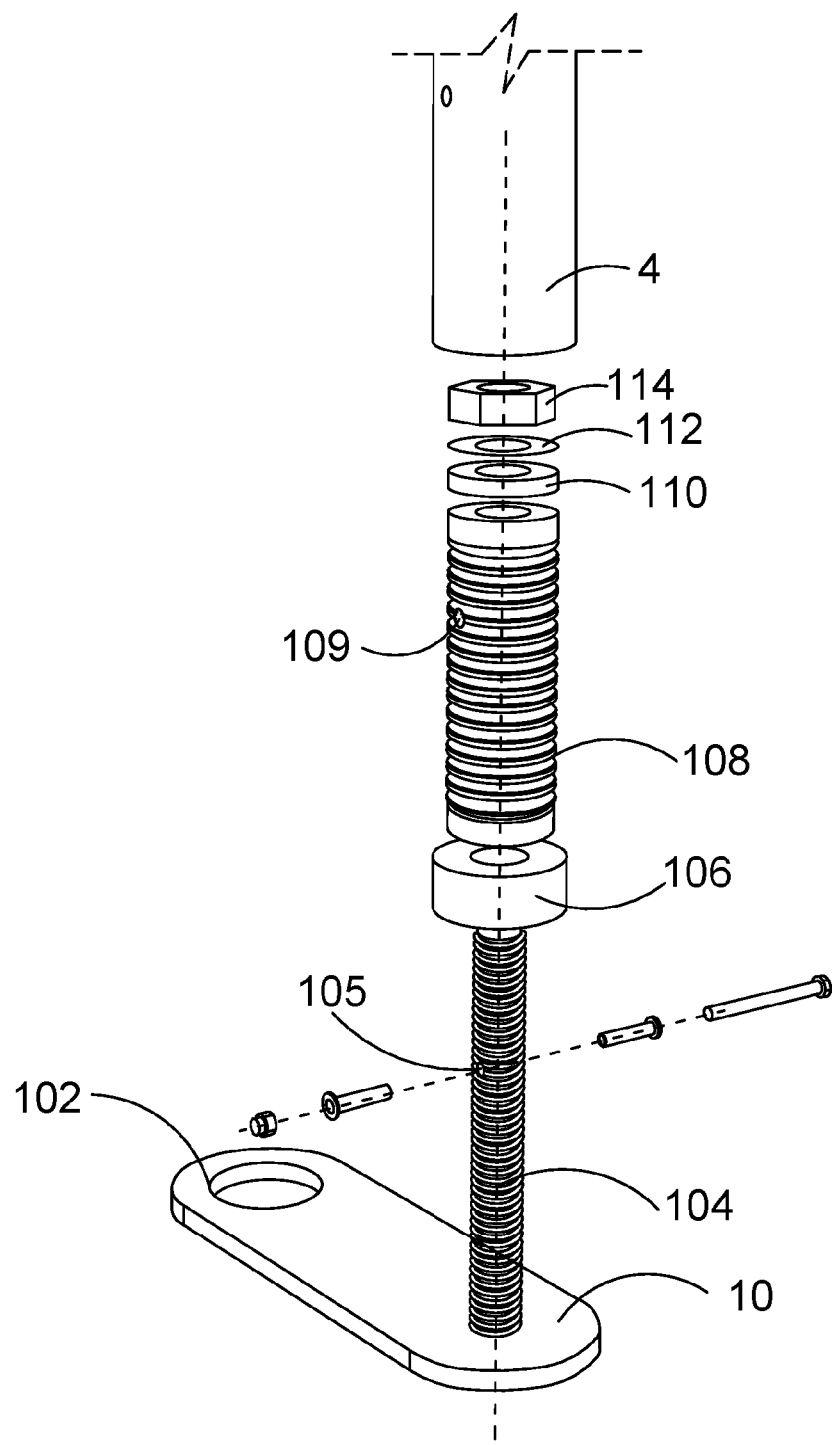
FIG. 3 is an exploded view of an upright and foot of the handrail assembly of FIG. 2.
Figure 4:
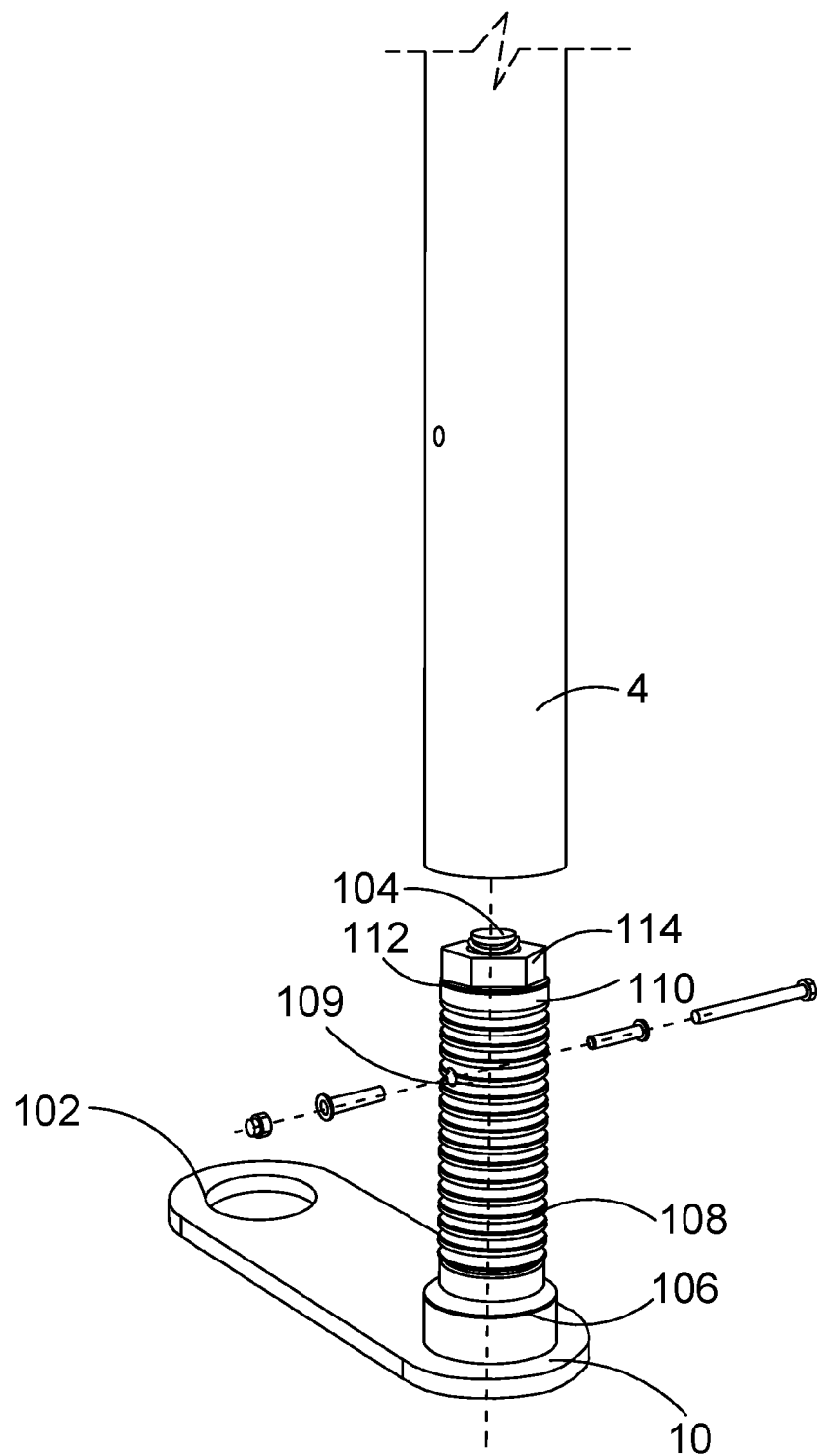
FIG. 4 is a detail view of the upright and foot shown in FIG. 3 at a first stage of assembly.
Figure 5:
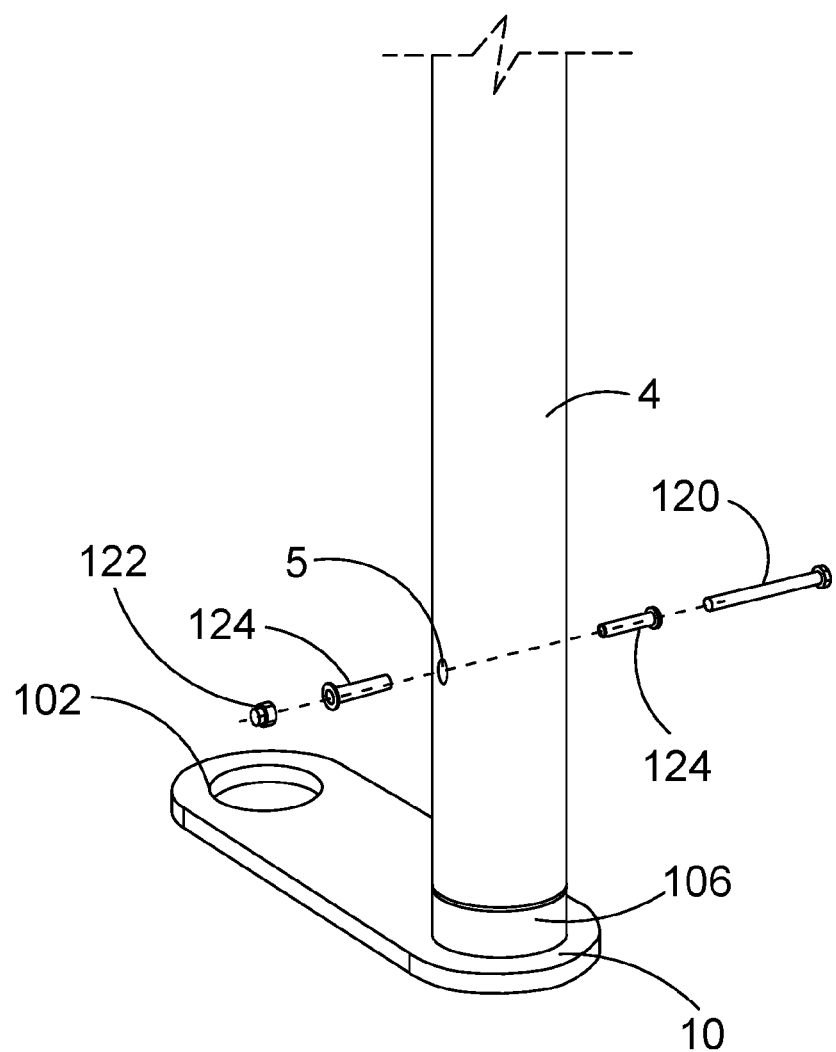
FIG. 5 is a detail view of the upright and foot shown in FIG. 3 at a second stage of assembly.

The manner in which each upright 4 is attached to a respective footplate 10 is shown in FIGS. 3-5. Although four styles of footplate are shown in use in the assembly shown in FIG. 2 the manner in which the uprights are attached to the footplates is substantially the same no matter which type of plate is used.

The footplate 10 has at least one attachment aperture 102 into which a fixture such as a counterweight bolt 11 (as seen in FIG. 2) is inserted in order to secure the footplate and handrail assembly to the body of the work machine. The footplate 10 also includes a threaded rod 104 which is offset from the attachment aperture(s) 102 and projects upwards from the footplate. The rod 104 is welded to the footplate so that it cannot rotate relative thereto.

A lower elastomeric damper ring 106 has an inner diameter greater than the diameter of the rod 104 and is placed over the rod 104 and lowered until it contacts the upper surface of the footplate 10. The lower damper ring 106 has an outer diameter which is equal to or greater than an outer diameter of the tubular upright 4. A plastic cylindrical collar or sleeve 108 is then placed over the rod 104 so as to sit atop the lower damper ring 106. The collar 108 has a corrugated outer surface, with grooves extending circumferentially about the outer surface. A bonding layer is applied to the outer surface of the collar 108, covering at least a portion of the outer surface and extending into at least some of the grooves. The bonding layer may comprise a layer of flexible adhesive, or alternatively may be a flexible layer of adhesive and sealant combined.

After the adhesive-coated collar 108 has been located on the rod 104 it is followed by an upper elastomeric damper ring 110, a washer 112 and a locking nut 114, where the nut 114 is threaded into the free end of the rod 104 and tightened to hold the various components together. The plastic collar 108 and upper damper ring 110 are substantially the same diameter, which is less than that of the lower damper ring 106. Each of the rod 104 and collar 108 has a respective fixing aperture 105,109 running transversely it, with the apertures 105, 109 located so that they cooperate to receive mechanical fixtures when the components are assembled together. FIG. 4 shows the damping arrangement once the locking nut 114 has been tightened down to hold the components together.

As seen in FIG. 5, once the nut 114 has tightened down on the damping components the lower end of the tubular upright 4 can be brought down over the top of the components. As the lower damping ring 106 has an outer diameter which is equal to or greater than that of the upright 4 the lower end of the upright sits on top of the lower damping ring 106, compressing the lower damping ring 106 between the footplate 10 and the upright 4. Each upright 4 has a pair of diametrically opposed fixing apertures 5 which are positioned so as to align with the corresponding apertures 105,109 in the rod 104 and collar 108 when the upright is pressed down onto the lower damping ring 106.

Once all of the apertures 5,105,109 are aligned the upright can be attached to the damping components by mechanical fixtures extending through the apertures. In the illustrated embodiment those fixtures comprise a threaded bolt 120, a dome nut 122 received on the end of the bolt 120, and a pair of rubber washer sleeves 124. The washer sleeves are inserted into the cooperating apertures 5,105,109 from either side of the upright, before the bolt is passed through the apertures and the dome nut threaded onto the end of the bolt and tightened to secure the entire damping arrangement together.

The adhesive on the outer surface of the collar 108 ensures a strong bond between the collar and the inner surface of the upright 4.

By forming a handrail assembly from plastic components the assembly of the present invention is more durable than existing metal assemblies and does not interfere with electronic communications to and from the work machine. A plastic handrail assembly is also typically 75% lighter than the equivalent made from mild steel, and is also self-coloured so does not need to be painted before installation or restored later.

The damping arrangements of the present invention also ensure that the handrail assembly is isolated to a large extent from the vibrations of the work machine, thereby minimising vibration fatigue as well as preventing the loosening of mechanical fixtures holding the assembly together and to the work machine. Thus the present invention reduces the amount of maintenance and inspection time needed, as well as increasing the longevity of the assembly components. Furthermore, by providing each vertical support member of the handrail with a damping arrangement as described above, any loads or forces applied to one area of the handrail assembly are spread and shared across the assembly and multiple vertical supports. Each vertical support member has a degree of flexibility provided by its respective damping arrangement, which reduces the likelihood of any part of the handrail assembly being damaged when such a load or force is applied to it.

The mechanical fixtures used in the present invention may be formed from A2 grade stainless steel. Each fixture is preferably provided with one or more anti-vibration washers. All of the uprights, intermediate rails, top rails, clamps and connectors used in the present invention are preferably formed from the same plastics material (e.g. GRP or PVC).

Each footplate may include at least one elastomeric damping element located on the underside of the footplate, such that when the footplate is attached to the body of the work machine the damping element(s) is/are compressed between the footplate and the body. The damping elements may be pads or rings, for example. Ring-shaped damping elements may be axially aligned with a corresponding attachment aperture in the footplate.

The counterweight bolts used to attach at least some of the footplates to the work machine may have a tightening nut integrally formed on the head of the bolt. The head of the bolt may include a circular flange adapted to receive a locking pin to secure the bolt against any rotation once tightened.

Modifications and improvements may be incorporated without departing from the scope of the invention as defined by the appended claims.

The invention claimed is:

1. A handrail assembly for a work machine, the assembly comprising:
   at least one generally horizontal rail member;
   a plurality of generally vertical tubular support members, each support member having a first end attached to the at least one rail member, and a second end which is open; and
   a plurality of support plates, each support plate having a first portion adapted to be attached to the work machine and a second portion adapted to be attached to the second end of one of the tubular support members;
   a plurality of attachment means for attaching the second end of each support member to a respective support plate; and
   a plurality of first elastomeric damping elements, where a first elastomeric damping element is sandwiched longitudinally between each support member second end and its respective support plate.

2. The handrail assembly of claim 1, wherein each first elastomeric damping element is annular and each attachment means comprises:
   a rod having a first end attached to the second portion of the support plate and projecting upwards from the support plate inside the second end pf the support member, the first elastomeric damping element being located about the first end of the rod and the rod having a first fixing aperture extending transversely through the rod;
   a pair of second fixing apertures provided at diametrically opposed locations on the support member; and
   a mechanical fixture adapted to pass through the first and second fixing apertures in order to secure the support member to the support plate when the first and second fixing apertures are aligned.

3. The handrail assembly of claim 2, wherein the rod is threaded and each attachment means further comprises:
   a cylindrical sleeve located about the rod inside the second end of the support member and having a first end in contact with the first elastomeric damping element;

a second elastomeric damping element being located about the rod and in contact with a second end of the sleeve; and a locking nut threaded onto a second end of the rod so as to secure the first and second damping elements and the sleeve on the rod;

wherein the sleeve has a pair of third fixing apertures at diametrically opposed locations on the sleeve, and wherein the mechanical fixture is adapted to pass through the first, second and third fixing apertures in order to secure the support member to the support plate when the first, second and third fixing apertures are aligned.

4. The handrail assembly of claim 3, wherein the sleeve is corrugated and includes a plurality of grooves running circumferentially about an outer surface of the sleeve, and wherein an adhesive layer is provided on the outer surface of the sleeve so as to adhere the sleeve to an internal surface of the second end of the support member.

5. The handrail assembly of claim 2, wherein the mechanical fixture comprises a threaded bolt and the assembly further comprises at least one elastomeric sleeve which extends through the fixing apertures and receives the threaded bolt.

6. The handrail assembly of claim 5, wherein the elastomeric sleeve has a flange at one end thereof, which limits the extent to which the sleeve can enter the fixing apertures.

7. The handrail assembly of claim 1, wherein each support plate has a support surface which in use lies upon the work machine, and wherein the assembly further comprises at least one elastomeric support element provided on the support surface.

8. The handrail assembly of claim 7, wherein the first portion of the support plate includes at least one attachment aperture, and the at least one elastomeric support element is annular and surrounds the at least one attachment aperture.

9. The handrail assembly of claim 1, wherein the at least one rail member and support members are attached to one another by pairs of clamp members which are secured to one another about a support member and/or rail member.

10. The handrail assembly of claim 9, wherein the at least one rail member, support members and clamp members are formed from a plastics material.

11. The handrail assembly of claim 1, wherein the at least one rail member and support members are formed from a plastics material.

12. The handrail assembly of claim 11 wherein the plastics material is glass reinforced plastic.

13. The handrail assembly of claim 1, wherein at least one support plate has a pair of first portions adapted to be attached to the work machine, and a pair of second portions, each second portion adapted to be attached to a second end of one of the support members.

14. A work machine comprising a handrail assembly comprising:
at least one generally horizontal rail member;
a plurality of generally vertical tubular support members, each support member having a first end attached to the at least one rail member, and a second end which is open; and
a plurality of support plates, each support plate having a first portion adapted to be attached to the work machine and a second portion adapted to be attached to the second end of one of the tubular support members;
a plurality of attachment means for attaching the second end of each support member to a respective support plate; and
a plurality of first elastomeric damping elements, where a first elastomeric damping element is sandwiched longitudinally between each support member second end and its respective support plate.

* * * * *